(12) United States Patent
Lipton et al.

(10) Patent No.: US 10,259,161 B2
(45) Date of Patent: Apr. 16, 2019

(54) DEPOSITION OF MATERIALS FOR EDIBLE SOLID FREEFORM FABRICATION

(75) Inventors: Jeffrey I. Lipton, Hamden, CT (US); Hod Lipson, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 679 days.

(21) Appl. No.: 13/981,169

(22) PCT Filed: Jan. 23, 2012

(86) PCT No.: PCT/US2012/022210
§ 371 (c)(1),
(2), (4) Date: Sep. 25, 2013

(87) PCT Pub. No.: WO2012/103005
PCT Pub. Date: Aug. 2, 2012

(65) Prior Publication Data
US 2014/0013962 A1    Jan. 16, 2014

Related U.S. Application Data

(60) Provisional application No. 61/435,732, filed on Jan. 24, 2011, provisional application No. 61/435,735, filed on Jan. 24, 2011.

(51) Int. Cl.
*B29C 64/209* (2017.01)
*B33Y 30/00* (2015.01)
*B29C 44/16* (2006.01)
*A47J 43/25* (2006.01)
*A47J 43/04* (2006.01)
(Continued)

(52) U.S. Cl.
CPC ............ *B29C 64/209* (2017.08); *A23P 20/20* (2016.08); *A47J 43/04* (2013.01); *A47J 43/25* (2013.01); *B29C 37/0025* (2013.01); *B29C 44/16* (2013.01); *B29C 64/106* (2017.08); *B33Y 30/00* (2014.12); *A23P 2020/253* (2016.08)

(58) Field of Classification Search
CPC ..... B29C 67/0055; B29C 64/10; B29C 64/20; B29C 64/30; B29C 64/209; A47J 43/25; A23P 1/086
See application file for complete search history.

(56) References Cited

U.S. PATENT DOCUMENTS 4,076,846 A * 2/1978 Nakatsuka .............. B29C 66/71
426/105
4,421,251 A * 12/1983 Namdari .............. B65D 35/285
222/104
(Continued)

OTHER PUBLICATIONS

International Search Report dated Aug. 31, 2012 for PCT/US12/22210.
(Continued)

*Primary Examiner* — Matthew J Daniels
(74) *Attorney, Agent, or Firm* — Burns & Levinson LLP; Orlando Lopez (57) ABSTRACT

Technologies are provided herein for processing edible materials using tools associated with a fabrication system. In one aspect, a fabricator includes a control module and a drive assembly controlled by the control module. The fabricator also includes at least one food processing tool head coupled to the drive assembly that can process material for fabricating an edible structure on a build surface.

22 Claims, 12 Drawing Sheets

(51) Int. Cl.
*B29C 37/00* (2006.01)
*A23P 20/20* (2016.01)
*B29C 64/106* (2017.01)
*A23P 20/25* (2016.01)

(56) References Cited

U.S. PATENT DOCUMENTS

| | | | |
|---|---|---|---|
| 5,121,329 A | 6/1992 | Crump | |
| 5,147,653 A * | 9/1992 | Nelson | B05B 7/14 156/382 |
| 5,217,672 A * | 6/1993 | Kelman | B29B 11/16 264/121 |
| 5,336,455 A * | 8/1994 | Kelman | B29B 11/16 264/113 |
| 5,622,216 A * | 4/1997 | Brown | B22D 11/00 164/71.1 |
| 5,673,539 A * | 10/1997 | Jonovic | B65B 25/068 241/93 |
| 6,101,968 A * | 8/2000 | Fitzgibbons | A21C 15/005 118/14 |
| 6,280,784 B1 | 8/2001 | Yang et al. | |
| 6,280,785 B1 | 8/2001 | Yang et al. | |
| 6,372,178 B1 | 4/2002 | Tseng | |
| 6,722,872 B1 * | 4/2004 | Swanson | B29C 41/36 425/225 |
| 7,625,198 B2 | 12/2009 | Lipson et al. | |
| 7,725,209 B2 | 5/2010 | Menchik et al. | |
| 2002/0171177 A1 * | 11/2002 | Kritchman | B29C 67/0059 264/401 |
| 2006/0156978 A1 * | 7/2006 | Lipson | B29C 67/0055 118/708 |
| 2007/0272398 A1 * | 11/2007 | Chan | F24C 7/04 165/185 |
| 2008/0253941 A1 * | 10/2008 | Wichers | A61L 2/10 422/186.3 |

OTHER PUBLICATIONS

Lipton, J.I., et al., (2010) "Multi-Material Food Printing with Complex Internal Structure Suitable for Conventional Post-Processing", 21st Solid Freeform Fabrication Symposium (SFF'10), Austin TX, USA.

Cohen, D.L., et al., (2009) "Hydrocolloid Printing: A Novel Platform for Customized Food Production" Solid Freeform Fabrication Symposium (SFF'09), Aug. 3-5, 2009, Austin, TX, USA.

"The Cornucopia: MIT's 3D food printer patiently awaits 'the future'," available at http://www.engadget.com/2010/01/21/the-cornucopia-mits-3d-food-printer-patiently-awaits-the-futu/, posted Jan. 21, 2010.

Cornucopia: Prototypes and Concept Designs for a Digital Gastronomy. © 2003-2011 Marcelo Coelho. Available at: http://web.media.mit.edu/~marcelo/cornucopia/.

International Preliminary Report on Patentability dated Jul. 30, 2013 for PCT/US12/22210.

* cited by examiner

DEPOSITION OF MATERIALS FOR EDIBLE SOLID FREEFORM FABRICATION

CROSS-REFERENCE TO RELATED APPLICATIONS

This application is a U.S. national stage application under 35 U.S.C. 371 of co-pending International Application No, PCT/US12/22210 filed on Jan. 23, 2012 and entitled DEPOSITION OF MATERIALS FOR EDIBLE SOLID FREEFORM FABRICATION, which in turn claims priority to U.S. Provisional Patent Application No, 61/435,732 filed on Jan. 24, 2011, and to U.S. Provisional Patent Application No. 61/435,735 filed on Jan. 24, 2011, both of which are incorporated by reference herein in their entirety for all purposes.

BACKGROUND

Solid freeform fabrication systems have been used to fabricate solid three-dimensional structures using a few materials. At present, the structures are either made from pre-processed materials or processed after the entire structure is made. In various applications, including the food industry, materials are sometimes required to be processed before additional layers of materials are added. Accordingly, there is a need for methods and systems for solid freeform fabrication of edible foods.

BRIEF SUMMARY

Technologies are provided herein for processing edible materials using tools associated with a fabrication system. In one aspect, a fabricator includes a control module and a drive assembly controlled by the control module. The fabricator also includes at least one food processing tool head coupled to the drive assembly that can process material for fabricating an edible structure on a build surface.

In another aspect, a soft-shelled packet containing a material includes a soft outer shell having an outer surface, and an outlet through which the material is dispensed upon a force being applied to the outer surface, wherein the soft-shelled packet is sized to be received within a food processing tool head of a fabricator.

In yet another aspect, a fabricator includes a control module and a drive assembly controlled by the control module. The fabricator further includes at least one detachable food processing tool head configured to couple with the drive assembly. The tool head includes a housing for holding a soft-shelled packet comprising material, an actuation mechanism for dispensing material from the soft-shelled packet, an outlet for depositing the dispensed material to a build surface, and a food processing component configured to process the dispensed material deposited on the build surface via the outlet.

DETAILED DESCRIPTION

Technologies are provided herein for processing edible materials using tools associated with a fabrication system. By way of the present disclosure, solid edible materials may be grated, sliced, chopped, and deposited over a designated portion of a build surface or over the entire surface. Powdered material may also be deposited. Furthermore, materials being deposited may also be processed as a layer of material is being deposited, or in some embodiments, before, between or after layers of materials have been deposited. Examples of processing operations include, but are not limited to, heating, frying, cooling, humidifying, and supplying hot air or other gases. Furthermore, providing ultraviolet light or maintaining the fabricator in an anaerobic environment can keep the environment sterile, preventing the edible materials from being contaminated. Although edible materials may be used, it should be appreciated that the present disclosure is not limited to edible materials.

Further technologies are provided herein for a soft packet container for storing materials. The soft packet material may be flat, or accordion-shaped. In various embodiments, the soft packets may dispense material by applying a mechanical force or a pneumatic force. Details of the soft packets and the dispensing mechanisms are also provided herein.

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

Figure 1:
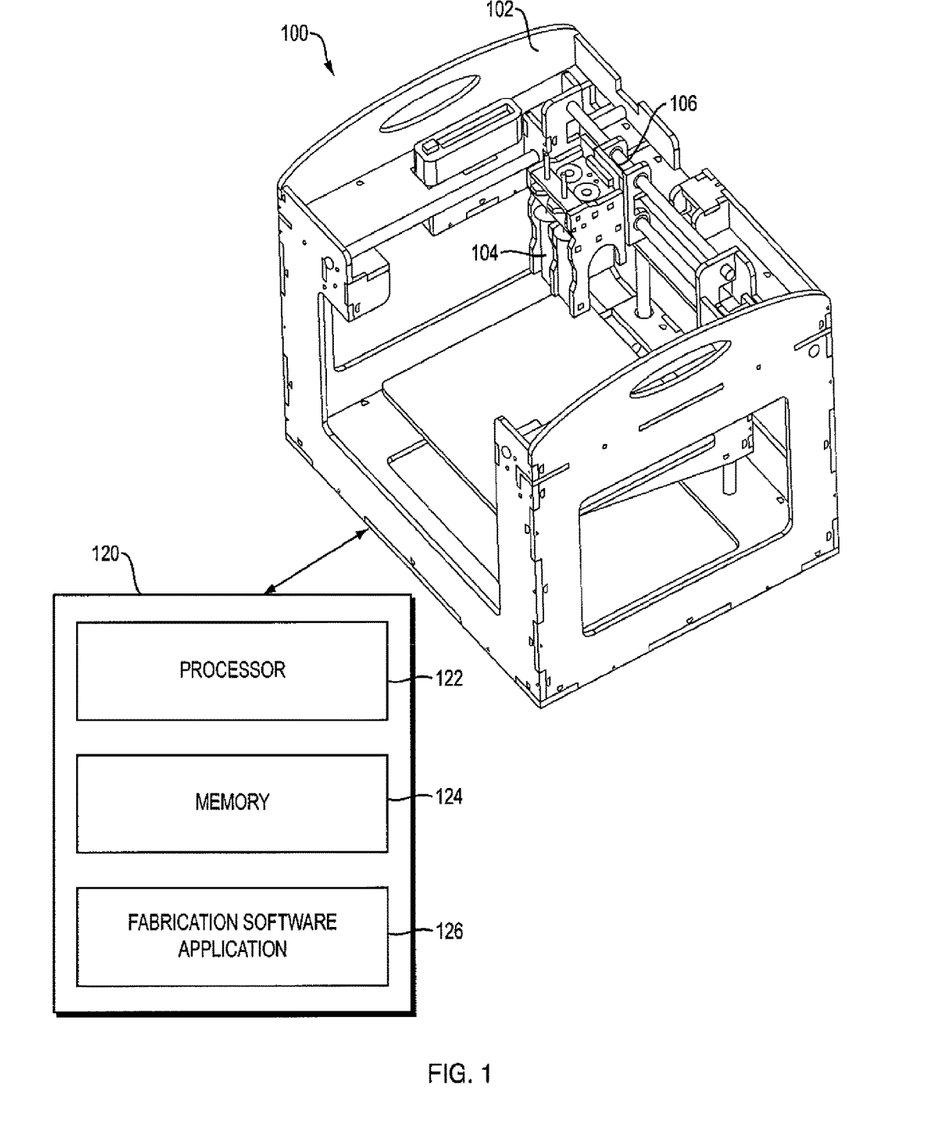
FIG. 1 is a pictorial schematic representation of a three dimensional fabrication system according to embodiments of the present disclosure.

Co-pending PCT patent application entitled "DEPOSITION TOOL WITH INTERCHANGEABLE MATERIAL BAY"WIPO publication W02012103007) and co-pending U.S. Utility patent application entitled "SYSTEMS AND METHODS FOR FREEFORM FABRICATION OF FOAMED STRUCTURES"U.S. Pat Publication 20120241993) both filed on Jan. 23, 2012 having first named inventor Jeffrey Lipton are hereby incorporated by reference in their entirety and for all purposes. In addition, issued U.S. Pat. No. 7,625,198 entitled "MODULAR FABRICATION SYSTEMS AND METHODS" is also hereby incorporated by reference in its entirety and for all purposes, Referring now to the figures, FIG. I is a pictorial representation of a three dimensional fabrication system for fabricating a structure according to embodiments of the present disclosure. The three dimensional fabrication system 100 comprises a fabricator 102 having at least one fabrication tool head 104 that is controlled by a control unit 106. In various embodiments, the control unit 106 may include a drive assembly that is configured to receive modular fabrication tool heads, such as the tool head 104, and control the movement of the modular tool head 104 such that the tool head 104 can either deposit or process material at any particular portion of a surface on which the structure is being fabricated. In various embodiments, the drive assembly includes a gantry mechanism for moving the tool head over an entire build surface.

The control unit 106 may be configured to receive instructions from a processing unit 120. The processing unit 120 includes, but is not limited to, a processor 122, a memory 124, and a fabrication software application 126, which is executable by the processor 122. The fabrication software application 126 is configured to provide instructions to the control unit 106 to cause the fabricator 102 to perform particular functions to prepare fabricated structures. In some embodiments, these fabricated structures may be related to edible materials, while the functions being performed by the fabricator may include functionality that processes the materials to make them edible. As will be described in further detail below, some of these functions may entail processing one or more layers of the materials as they are printed.

Figure 2:
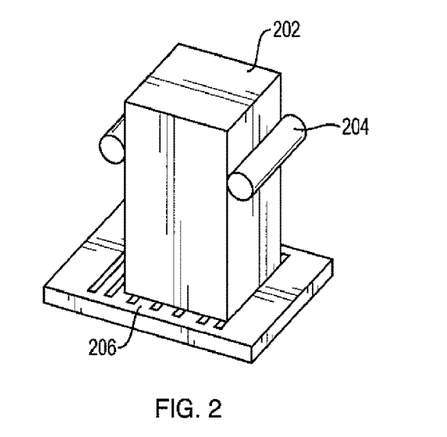
FIG. 2 is a pictorial representation of a roller driven solid material oscillating grating mechanism according to embodiments of the present disclosure.
Figure 3:
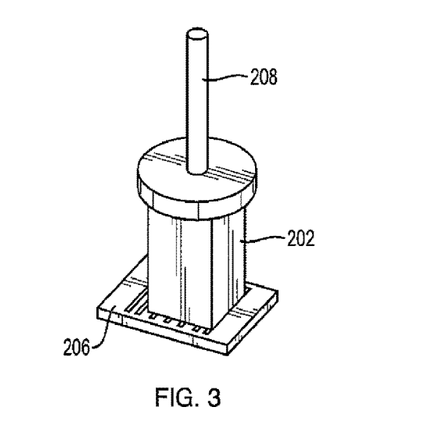
FIG. 3 is a pictorial representation of a plunger driven solid material oscillating grating mechanism according to embodiments of the present disclosure.
Figure 4:
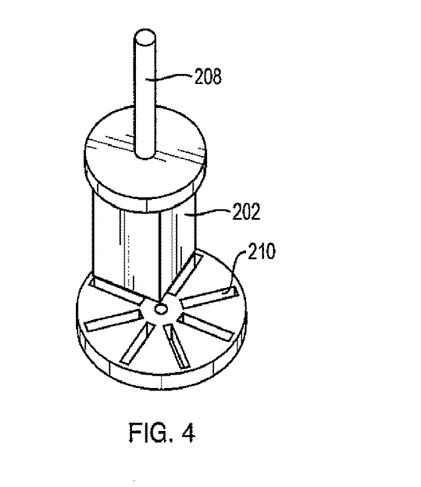
FIG. 4 is a pictorial representation of a plunger driven solid material rotating slicing and grating mechanism according to embodiments of the present disclosure.

Referring now to FIGS. 2-4, various inline solid food processing tool heads configured to adapt to the fabricator 102 are shown. In particular, FIG. 2 is a pictorial representation of a roller driven solid material oscillating grating mechanism. In particular, a grating tool head 204 may be configured to adapt to the fabricator 102 such that the control unit 106 of the fabricator 102 can control the operations of the grating tool head 204.

An edible solid material 202 may be driven towards an oscillating grating tool head 204 causing the grating tool head 204 to grate the solid material 202 via a grating surface 206 of the grating tool head 204. As the edible material is driven towards the grating surface 206, the material 202 is processed into the desired form and distributed across the target surface. For example, a block of solid cheese could be driven down towards the oscillating grating surface 206, which grates the cheese such that the grated cheese applies an even coating, while the tool head 204 and grating surface 206 moves across the build surface. Similarly, a stick of butter could move down a prescribed amount, and then a slicing mechanism could slide across the exposed portion to deposit it across the surface. In various embodiments, the material can be driven down using a roller based mechanism, as shown in FIG. 2, or a plunger based mechanism as shown in FIGS. 3 and 4. In such embodiments, a plunger 208 may be controlled by the control unit as well, thereby controlling the speed at which the material is processed by the processing tool head. FIG. 4 shows a rotating slicing and grating tool head 210, which is also configured to be used with the fabricator 102. It should be appreciated that other tool head designs may process food differently, including but not limited to, grating, slicing, dicing, shaving, or blending foods for deposition. In some embodiments, the fabrication software application may be configured to stochastically distribute these materials over the build surface resulting in a random distribution of layers.

Figure 5A:
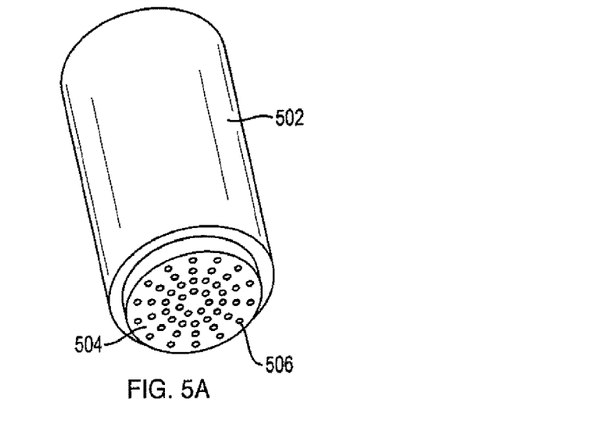
FIGS. 5A and 5B are pictorial representations of a vibrating disk powder deposition mechanism according to embodiments of the present disclosure.
Figure 5B:
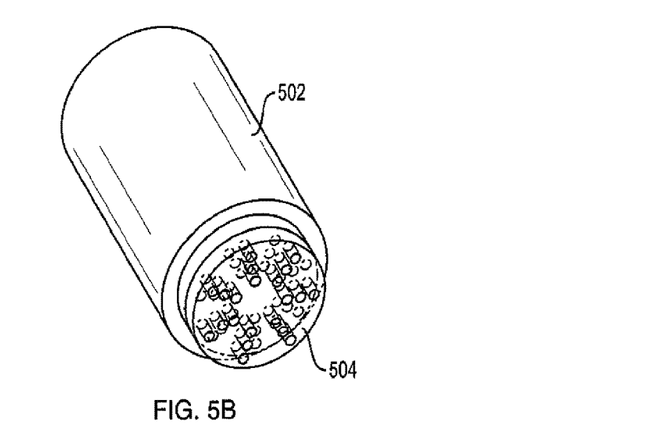
Figure 6:
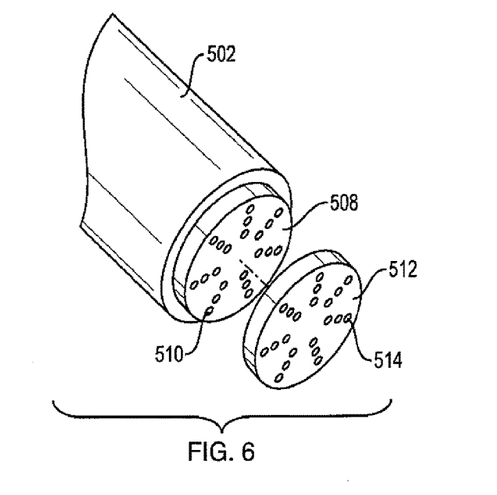
FIG. 6 is a pictorial representation of a spinning disk powder deposition mechanism according to embodiments of the present disclosure.

Referring now to FIGS. 5A and 5B and 6, powder deposition tool heads are shown, These powder deposition tool heads may be configured to adapt to the fabricator 102 such that the control unit 106 of the fabricator 102 can control the operations of the powder deposition tool heads. In particular, powder may be contained in a powder container 502. FIGS. 5A and 5B show the powder container 502 having a first end fitted with a vibrating disk 504 having holes 506. FIG. 6 shows the powder container 502 fitted with a stationary disk 508 having holes 510 separated from a spinning disk 512 also having holes 514. As the spinning disk spins, powdered material from the powder container 502 passes through the holes 510 of the stationary disk 508, and passes through the holes 514 of the spinning disk 512.

In various embodiments, the spinning disk 512 and stationary disk 508 may be reversed, while in other embodiments, both the disks may rotate at different speeds. By utilizing powder deposition tool heads shown in FIGS. 5 and 6, powder can be deposited over an entire build surface, or a portion thereof. Powders may be deposited to prevent prevent interlayer adhesion for supporting materials or may be used to distribute flavor additives and powdered food over surfaces. Similar to the solid food processing tool heads, the powder deposition tool heads can also be mounted on the gantry mechanism of the fabricator 102. It should be appreciated that by keeping the tool head at a set distance from the deposition surface an even coating can be deposited.

In various embodiments, the fabricator may be configured to process materials after they are deposited on the build surface. For instance, after depositing grated cheese on the surface, there may be a desire to supply hot air to melt the grated cheese. Upon heating the cheese, there may be a desire to rapidly cool the heated cheese. These processes may be performed using food processing tool heads, such as those shown in FIGS. 7-12.

Figure 7:
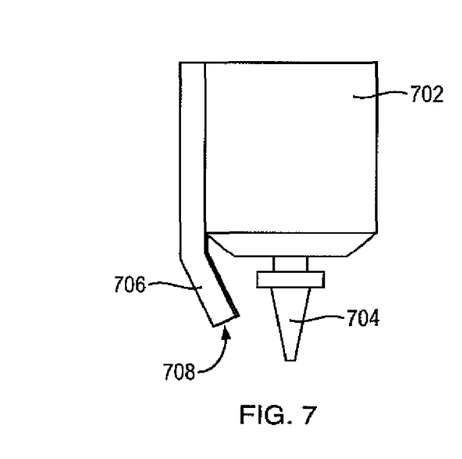
FIG. 7 is a pictorial representation of a frying mechanism according to embodiments of the present disclosure.

FIG. 7 is a pictorial representation of a frying mechanism. In FIG. 7, a CNC controlled tool head 700 sprays and deposits hot liquid oils or fats onto the deposition surface. The tool head 700 may include a supply pipe for hot oil 706 having an outlet 708 and may be mounted on a material deposition tool that includes a material container 702 with a nozzle outlet 704, as shown. In other embodiments, the supply pipe 706 and outlet 708 may be manifested as an independent tool head.

The tool head 700 is configured to receive hot oil from a first end and deliver the hot oil on the build surface via the outlet 708. The outlet 708 may be configured to deliver the oil in one or more different forms, including, but not limited to spraying the oil, pouring the oil or squirting the oil. If located on a material deposition tool head, such as shown in FIG. 7, the outlet 708 may be mounted on a rotary track around the deposition tool head to allow the outlet 708 to deposit the oil onto the deposited material during or after the material is deposited onto the build surface.

It should be appreciated that the hot oil can be sprayed on a particular portion of the build surface or materials covering a portion of the build surface for localized frying of foods. Further, using this mechanism for dispensing hot oil allows for controlling the crispness of a food throughout the printed or fabricated structure.

Figure 8:
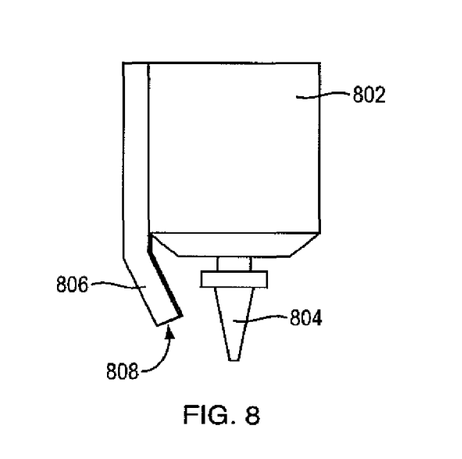
FIG. 8 is a pictorial representation of a chilling mechanism according to embodiments of the present disclosure.

FIG. 8 is a pictorial representation of a chilling mechanism that operates in a manner similar to the tool head of FIG. 7. Instead of the supply pipe 806 being configured to receive hot oil from a first end, the supply pipe 806 may receive cool air. The outlet 808 may direct the cool air towards the build surface or a portion of the build surface to be cooled. Cooled fluids, including gas, air, liquids, or combinations thereof, may be sprayed onto deposited materials to chance the materials. Similar to the tool head shown in FIG. 7, this tool head 800 may be an independent tool head or collocated with another deposition tool head. It should be appreciated that localized cooling tool heads, such as the cooling tool head 800, may be used to modify material viscosity or phase state.

Figure 9:
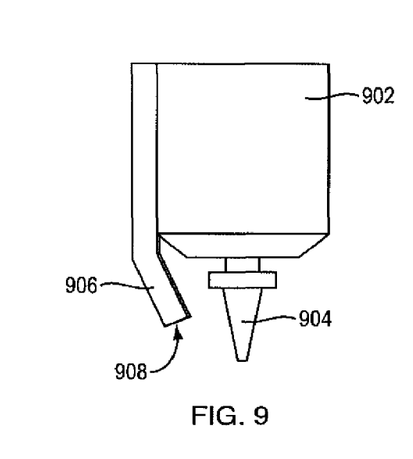
FIG. 9 is a pictorial representation of a hot air supply mechanism according to embodiments of the present disclosure.
Figure 10:
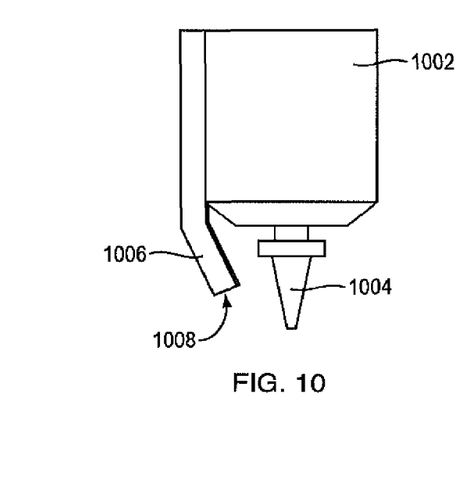
FIG. 10 is a pictorial representation of a gas supply mechanism according to embodiments of the present disclosure.
Figure 11:
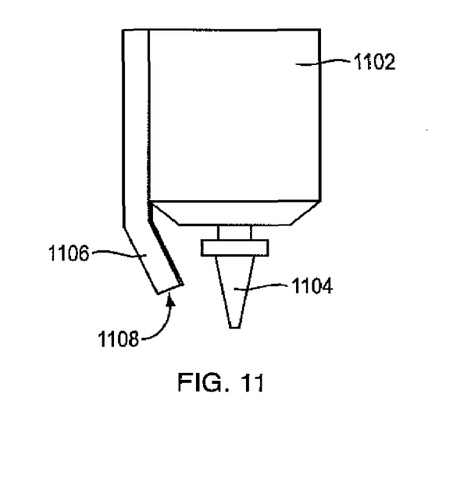
FIG. 11 is a pictorial representation of a electromagnetic wave emitter mechanism according to embodiments of the present disclosure.

FIGS. 9, 10, and 11 are pictorial representations of a hot air supply mechanism, a gas supply mechanism, and an electromagnetic wave emitter mechanism respectively. The supply pipe 906 may supply hot air, the supply pipe 1006 may supply a specific gas, and the supply pipe 1106 may be a source for emitting electromagnetic waves, such as microwaves. These tools may be utilized to rapidly cook food. In some embodiments, one or more of these tool heads may be configured to apply heat locally for broiling, baking foods, etc. It should be appreciated that the use of heat or other emissions, such as gases or electromagnetic waves or radiation, may cause a chemical change in the deposited material being exposed to such emissions. In this way, food may be prepared while the structure is still being fabricated as opposed to cooking the materials prior to depositing the layers or cooking the structure after the entire structure is fabricated. IT should be appreciated that using these tool heads can ensure even distribution of heat or emissions throughout a food structure or layer.

As described above, the supply pipes and corresponding outlets can be mounted as an independent tool head, or collocated with the deposition tool head. If collocated, the supply pipe may be placed on a rotary track around the deposition nozzle to allow the pipe to move along the path of the deposition nozzle. In some embodiments, the heat source could be a combination or radiative, convective or conductive head transfer sources. For example, a microwave emitter could be located on a tool head, or a high powered infra-red source could be used. A heated air source could be used for convection heating. All of the sources may be more intense than traditional cooking heat sources, reaching higher temperatures to cause the reactions of cooking to take place more quickly, allowing the heat exposure to be briefer. The higher the temperature, the faster the tool head could move ensuring the entire object is heated and cooked evenly throughout the machine.

Figure 12:
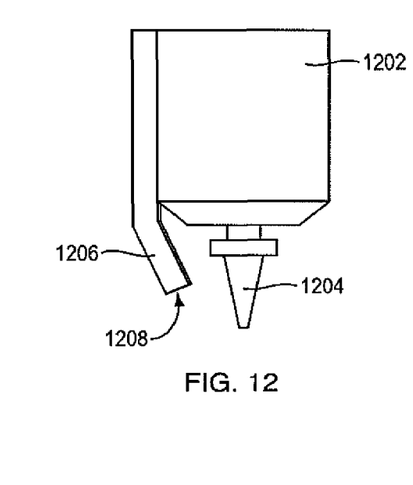
FIG. 12 is a pictorial representation of a humidifying mechanism according to embodiments of the present disclosure.

FIG. 12 is a pictorial representation of a humidifying mechanism. The structure of the humifying tool head is similar to those shown in FIGS. 7-11. The supply pipe 1206 for supplying humid air may provide humidity to materials on the build surface to control moistness and inter-layer adhesion of materials. In some embodiments, a humidity sensor and the outlet 1208 from supply pipe 1206 may be used to measure and control the humidity of the printed food. In some embodiments, a humidifier could be located on the tool head and be fed by a water line from a source, or the humidifier could be placed off the tool head.

Figure 13:
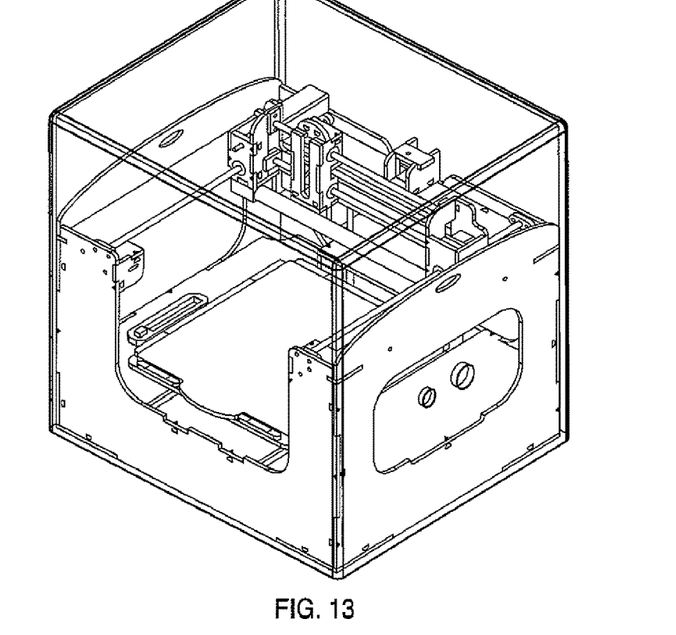
FIG. 13 is a pictorial representation of a pressurized build chamber around the fabricator of FIG. 1 according to embodiments of the present disclosure.
Figure 14:
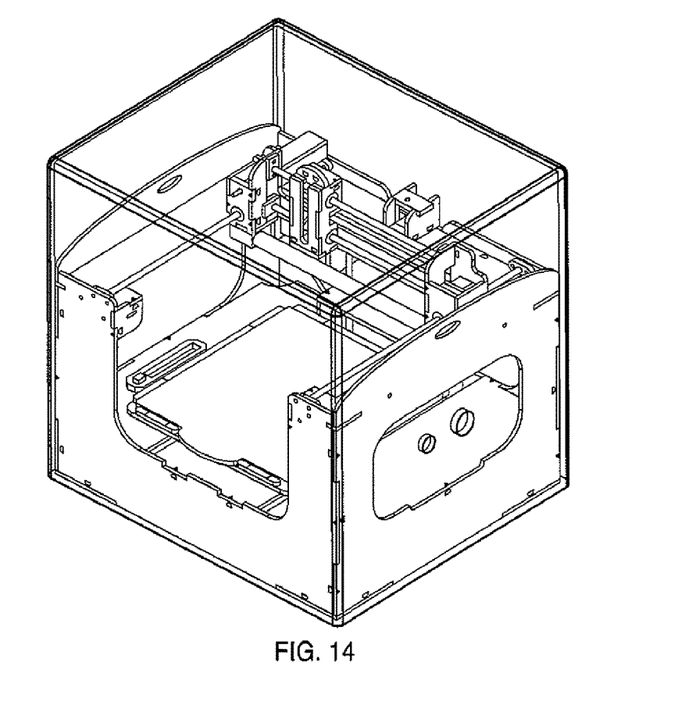
FIG. 14 is a pictorial representation of a of a anaerobic build chamber around the fabricator of FIG. 1 according to embodiments of the present disclosure.

FIGS. 13 and 14 are pictorial representations of a pressurized build chamber and an anaerobic build chamber, respectively. As shown, the fabricator 102 may be surrounded by a build chamber 1302 sealing the fabricator from external influences. The build chamber 1302 is made to be air tight with one or more openings for access to the build surface. Lines for the fluids are fed into the deposition tool heads within the build chamber. The build chamber may serve as a pressurized build chamber, as shown in FIG. 13. The pressurized build chamber includes a pressure inlet 1304 and a safety release valve 1306. Air can be supplied to the pressurized build chamber via the pressure inlet 1304, increasing the pressure inside the build chamber. To release pressure within the build chamber, the safety release valve 1306 may be opened. By increasing the pressure within the build chamber, fabricated materials may be cooked faster than at lower pressure levels.

In FIG. 14, the build chamber may serve as a anaerobic build chamber 1402. This build chamber 1402 may include a gas inlet 1404 and a one way valve 1406. In some embodiments, the gas inlet 1404 is configured to supply nitrogen gas to the anaerobic build chamber, which causes normal atmospheric air out of the build chamber 1402. By removing air and oxygen, the growth of organisms can be prevented while the food is being fabricated or prepared.

Figure 15:
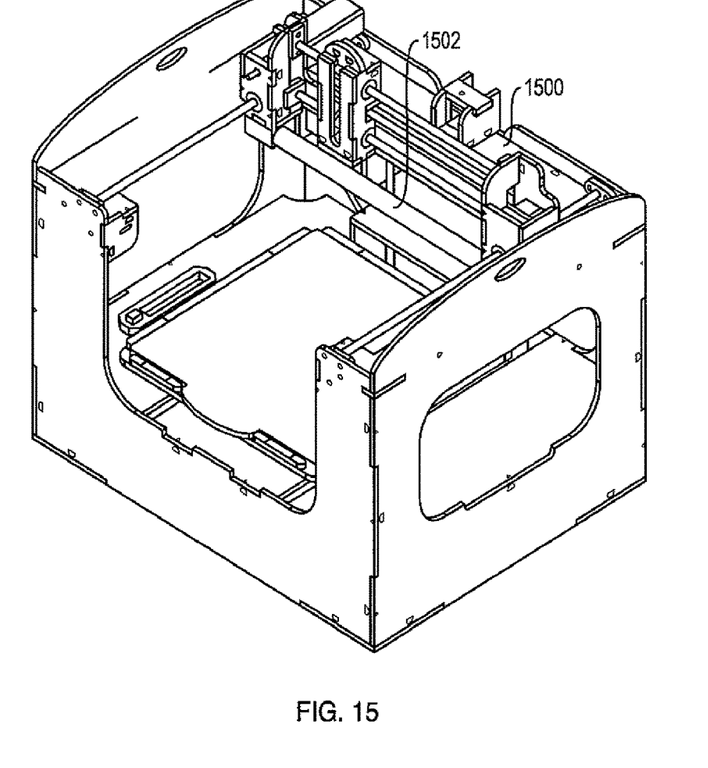
FIG. 15 is a pictorial representation of an ultraviolet light mechanism according to embodiments of the present disclosure.
Figure 16:
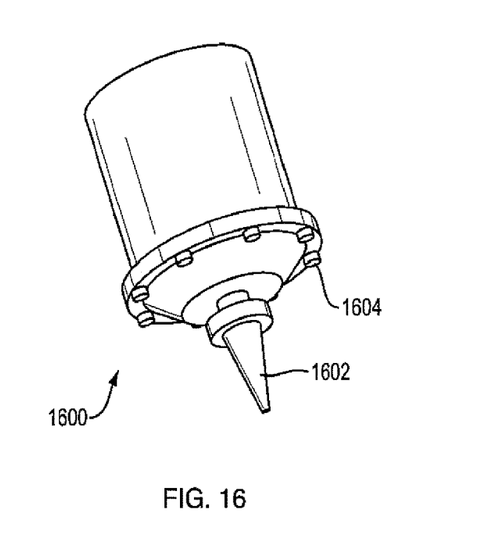
FIG. 16 is a pictorial representation of an ultraviolet light mechanism mounted on a deposition tool head according to embodiments of the present disclosure.
Figure 17A:
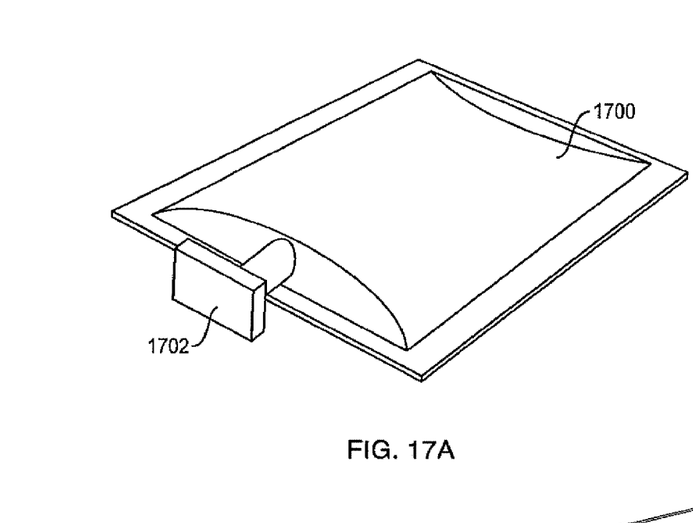
FIG. 17A is a pictorial representation of a flat soft packet for storing materials for use with the fabricator of FIG. 1 according to embodiments of the present disclosure.
Figure 17B:
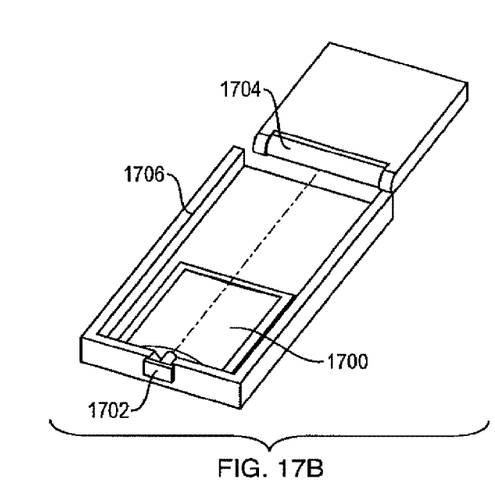
FIG. 17B is a pictorial representation of a single roller material dispensing mechanism containing the soft packet shown in FIG. 17 according to embodiments of the present disclosure.
Figure 17C:
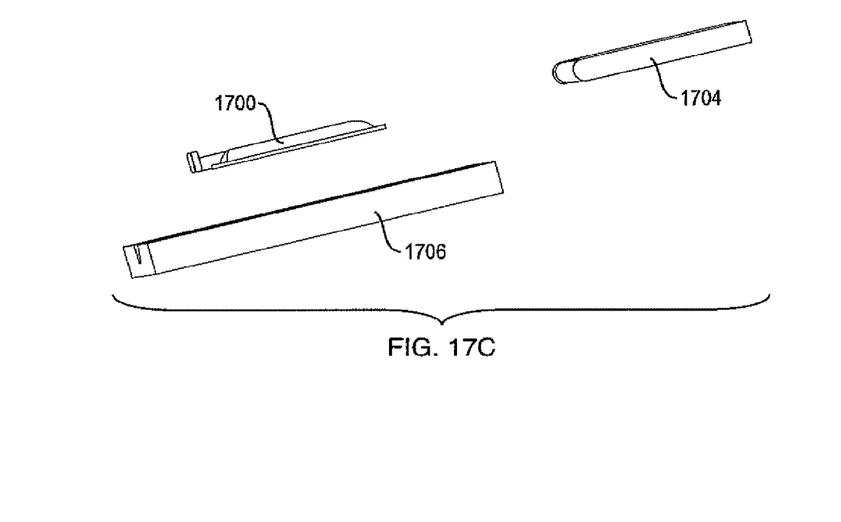
FIG. 17C is a pictorial representation of the individual components shown in FIG. 17B according to embodiments of the present disclosure.
Figure 17D:
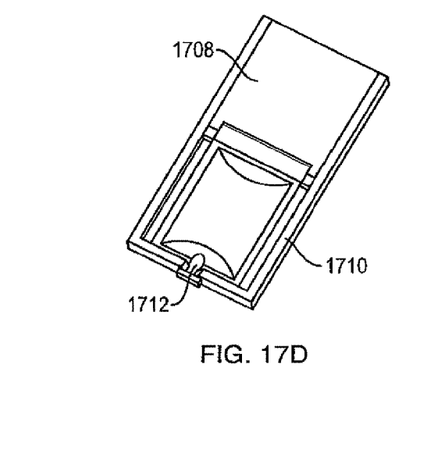
FIG. 17D is a pictorial representation of a double roller material dispensing mechanism according to embodiments of the present disclosure.
Figure 18A:
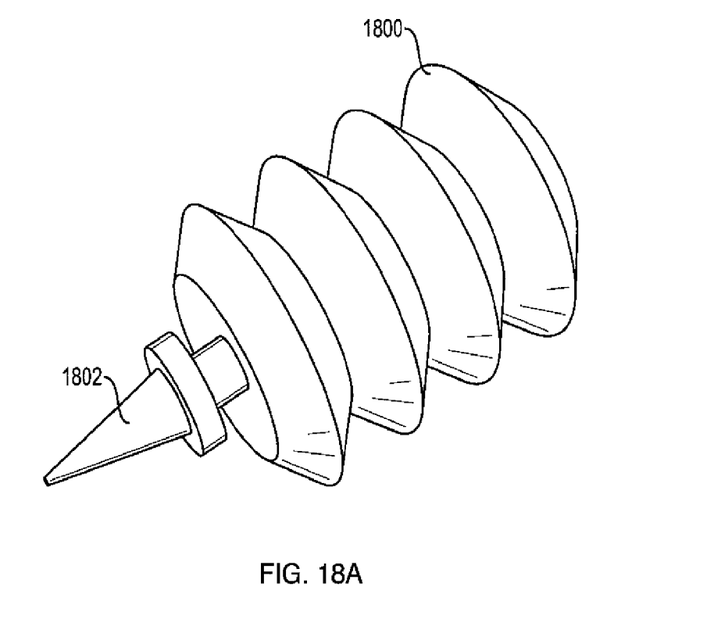
FIG. 18A is a pictorial representation of an accordion shaped packet mounted with a nozzle according to embodiments of the present disclosure.
Figure 18B:
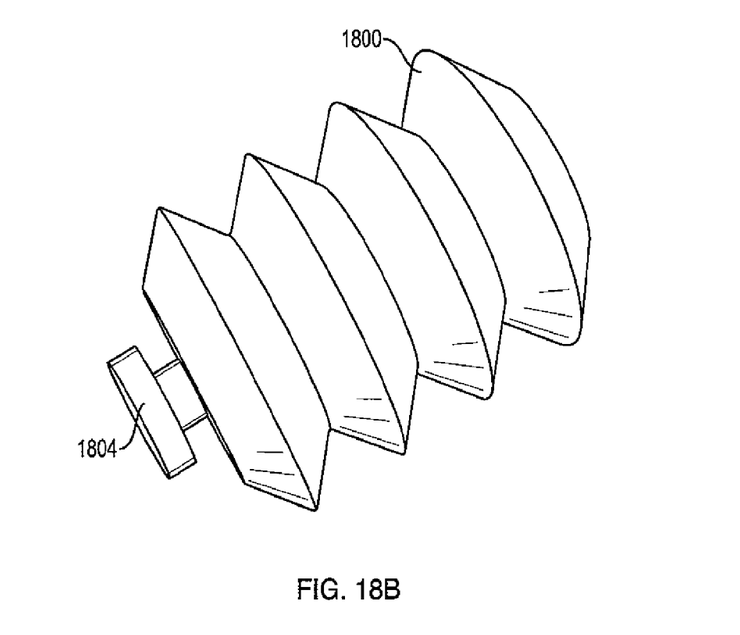
FIG. 18B is a pictorial representation of an accordion shaped packet according to embodiments of the present disclosure.

FIG. 15 is a pictorial representation of an ultraviolet light mechanism and FIG. 16 is a pictorial representation of an ultraviolet light mechanism mounted on a deposition tool head.

Food being fabricated or prepared can be sterilized by exposing the food to an ultraviolet source. This can be accomplished by having a single UV light source in the build chamber which can expose the entire exposed surface at once. In various embodiments, an IR light source may be used in a similar fashion to induce chemical reactions in the deposited material/s. Another method would include a UV light source which extends the length of an axis of the exposed surface and is scanned across the perpendicular axis, as shown in FIG. 15. FIG. 16 illustrates another embodiment, which includes a ring of lights around the deposition nozzles of a tool head. This light would sterilize the printed foods as the food is being deposited, or could scan across the printed food between each layer. Using the methods and devices described above, the build surface may also be sterilized. It should be appreciated that one or more of the heat sources used for cooking described above may also be used to sterilize the build surfaces.

Referring now to FIGS. 17-20, various embodiments of material containers are shown. These material containers are soft packets that may have soft shells and be collapsible as material is dispensed from the containers. These soft shelled containers or packets may be made from plastics and/or metal foils to contain prepared ingredients, such as condiments. The packets may be flat, as shown in FIG. 17A, or have an accordion shape, as shown in FIGS. 18A-18B. FIG. 17A illustrates a soft packet 1700 having a flat body and an outlet 1702. These soft packets may be designed for a single use or in other embodiments, may have a resealable outlet for multiple uses. In FIGS. 17B-17C, a single roller mechanism comprising a roller 1704 and a housing 1706 for dispensing material from the packet 1700 is shown. Material can be dispensed by having the packet 1700 insert into a roller 1704 which rotates, wrapping the packet 1700 around the roller 1704 and squeezing the material out. In other embodiments, the soft packet 1700 may be placed between two rollers with are in line with each other, as depicted in FIG. 17D.

In some embodiments, the packet may include an opening fitted with a one way valve or filter to prevent back flow of the material. The fluid stored in the packet could be dispensed using several methods. A displacement mechanism would regulate the volume of material extruded by having the mechanism deform the packet by a prescribed volume to ensure the equivalent volume of material is ejected into the fluid flow path. For instance, with respect to FIGS. 17A-D, as the rollers progress down the length of the packet 1700, a volume of material would be extruded. To control the fluid flow rate of the deposition system, pressure would be applied to the exterior of the packet 1700. This would cause the fluid to flow at a steady rate and charge the fluid flow path of the deposition head.

Figure 19A:
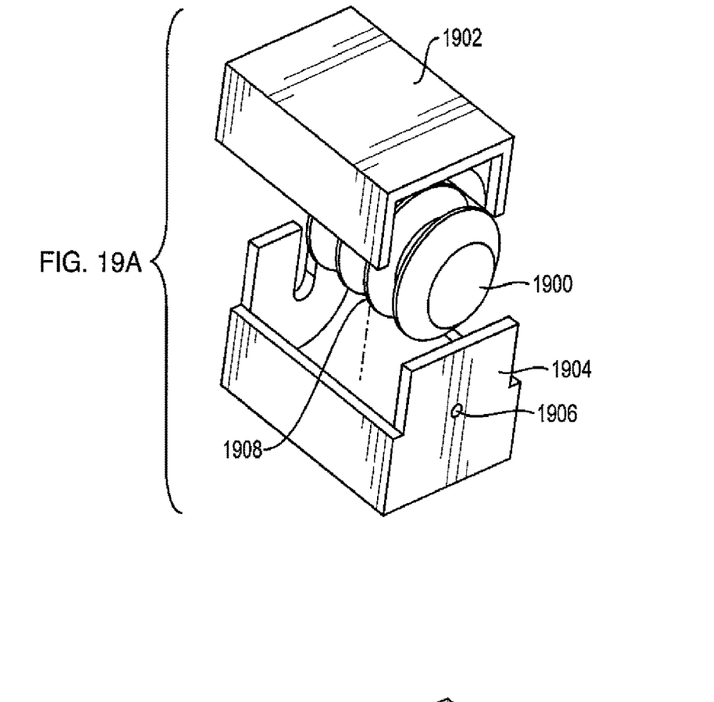
FIGS. 19A and 19B are pictorial representations of an accordion shaped packet and an associated housing having a pressure inlet to supply pressure to the soft packet according to embodiments of the present disclosure.
Figure 19B:
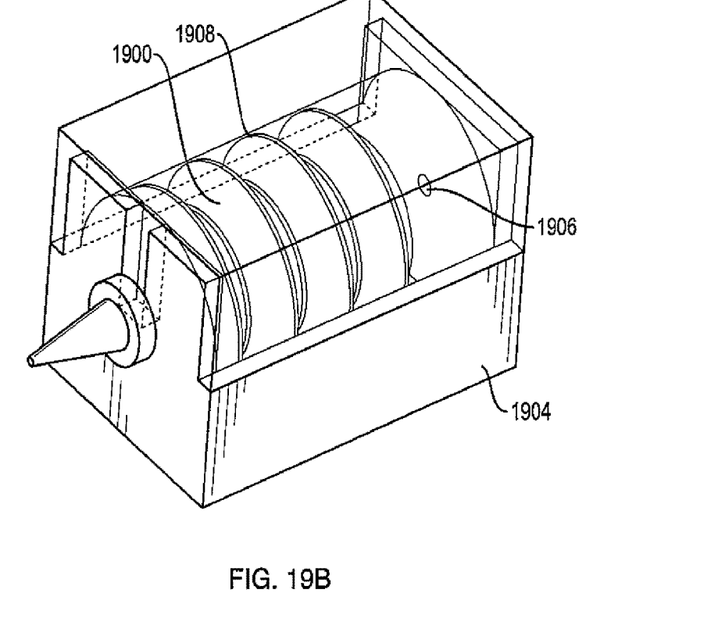

FIGS. 19A and 19B are pictorial representations of an accordion shaped hard-shelled packet 1900 and an associated housing having a pressure inlet to supply pressure to the hard packet 1900. Hard-shell packets are configured to retain their shape even when subjected to internal or external forces. In such embodiments, a mechanism can be used to draw out the contents into the deposition mechanism. In particular, material from within the hard packet can be driven out by either puncturing the package from a second point 1906, or having air tub inserted into the main opening of the package to pressurize it, driving the material out, as shown in FIGS. 21A-B.

In various embodiments, the packets could contain an identifier for identifying the contents to be deposited on the surface. In this way, the fabrication system 100 may automatically fabricate an entire structure by automatically identifying a material packet that contains the proper material for deposition.

Figure 20A:
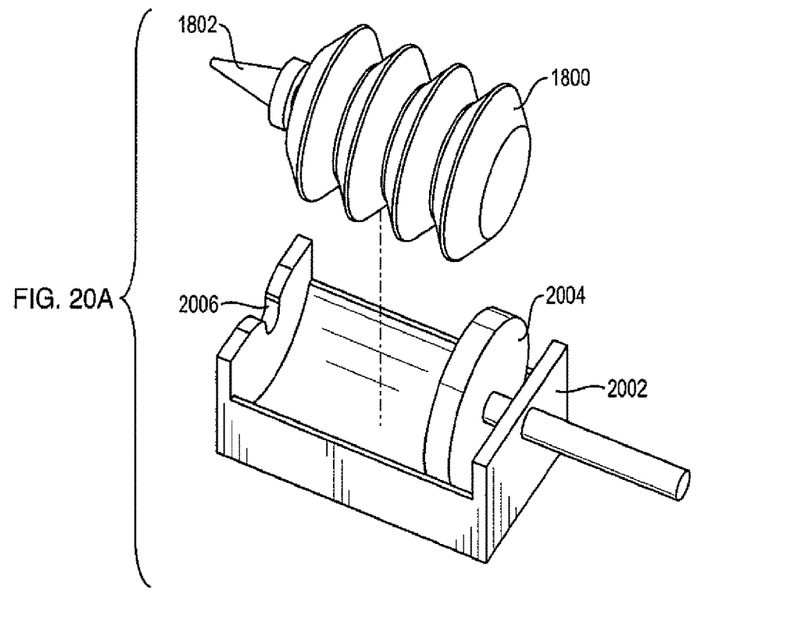
FIGS. 20A and 20B are pictorial representations of an accordion shaped packet and an associated housing having a plunger for dispensing material from the soft packet according to embodiments of the present disclosure.
Figure 20B:
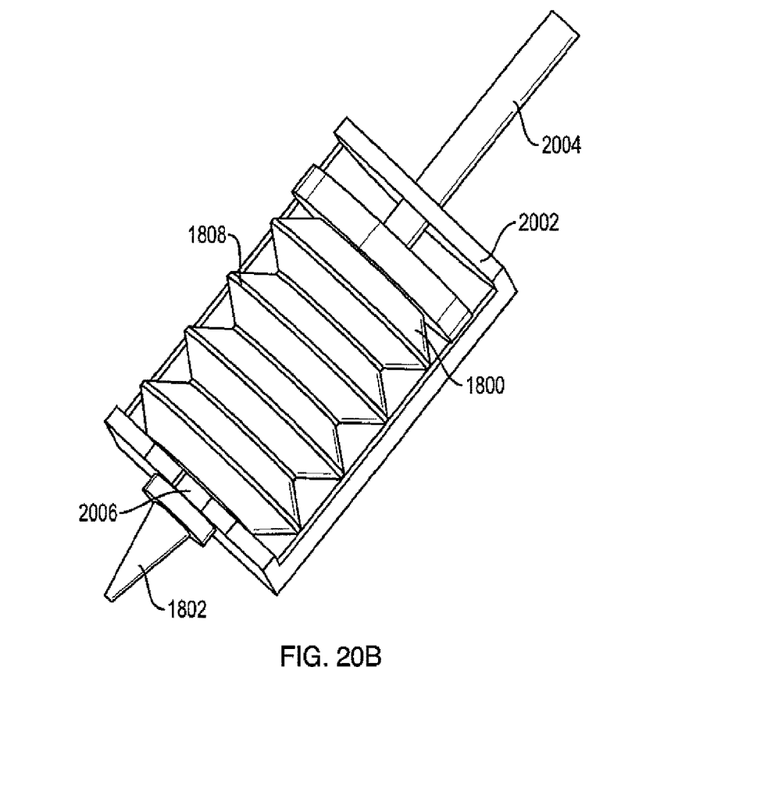

FIGS. 20A and 20B are pictorial representations of an accordion shaped soft packet and an associated housing having a plunger for dispensing material from the soft packet. A plunger 2004 may be configured to apply pressure at one end of the accordion shaped soft packet 1800. A clip in connector 2006 allows for the soft packet 1800 to be securely attached to the housing 2002.

Figure 21A:
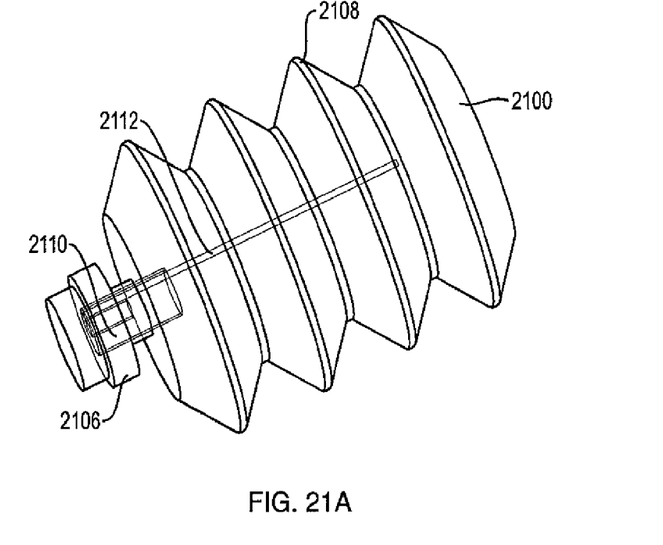
FIGS. 21A and 21B are pictorial representations of an accordion shaped packet coupled with a pressure actuation mechanism according to embodiments of the present disclosure.
Figure 21B:
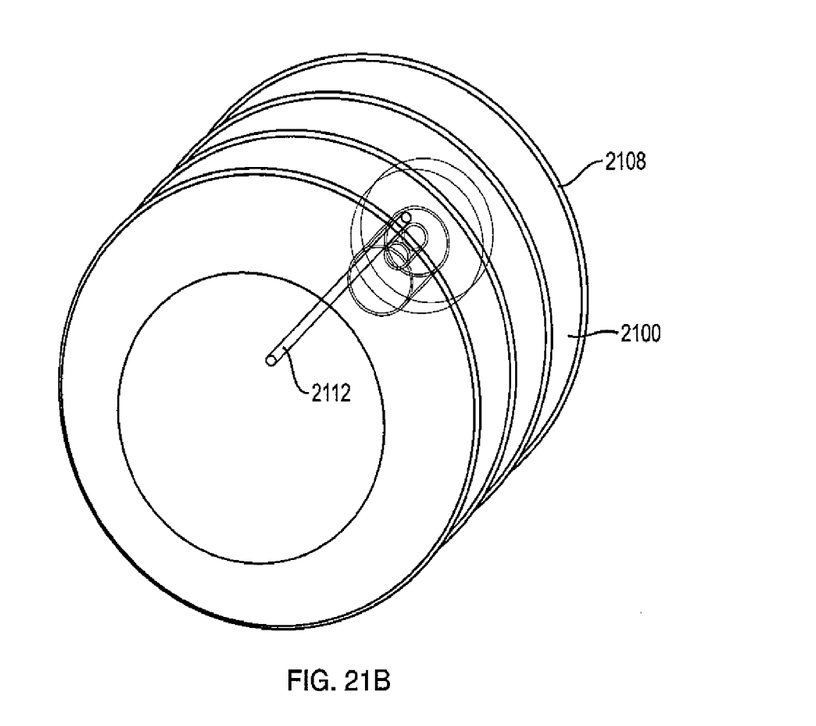

FIGS. 21A and 21B are pictorial representations of an accordion shaped hard packet 2100 coupled with a pressure actuation mechanism according to embodiments of the present disclosure. The packet 2100 includes ridges 2108 that seal the container to prevent air leaks. Furthermore, the hard packet 2100 may include a material outlet 2110 and a pressurized fluid outlet 2112.

Figure 22:
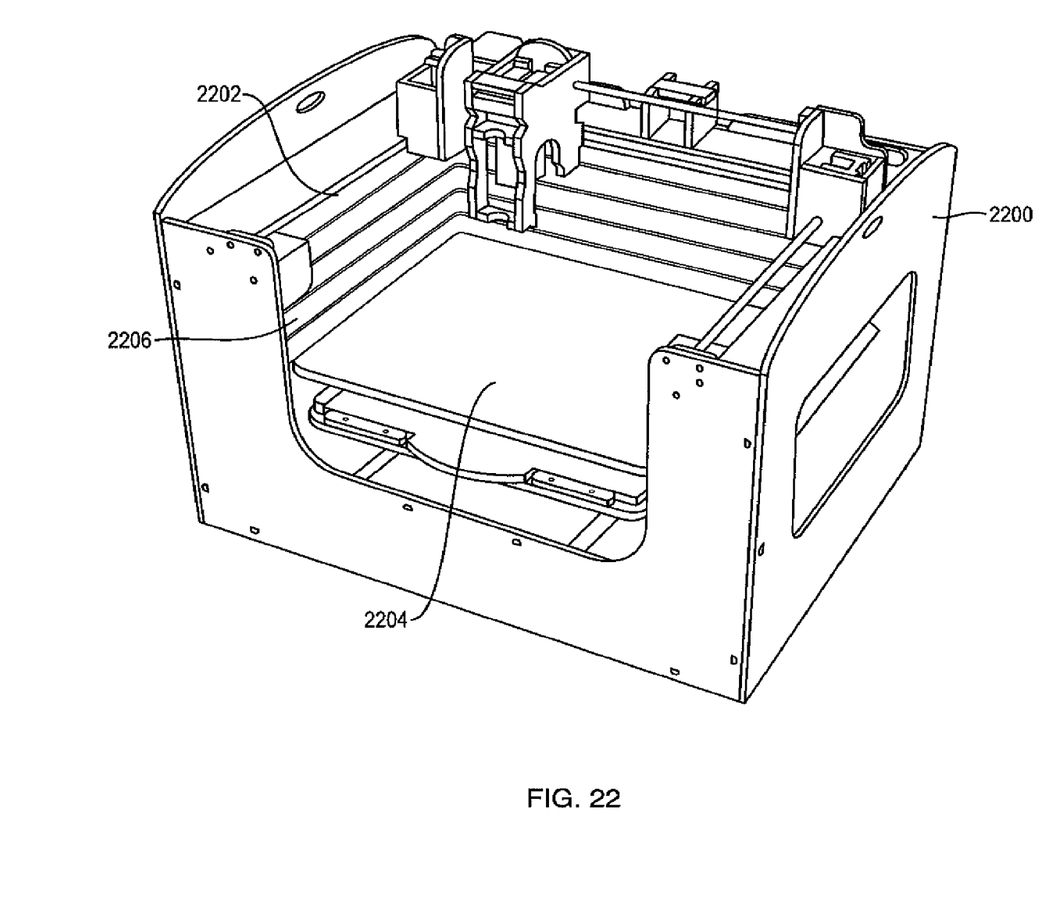
FIG. 22 is a pictorial representation of a printer liner mechanism adapted to a fabricator according to embodiments of the present disclosure.

FIG. 22 is a pictorial representation of a printer liner mechanism adapted to a fabricator. In various embodiments, a fabricator 2200 may be configured to engage with a removable attachment 2202 that allows printer liner 2204 to be placed. If a fabricator has a coupled/serial XY gantry, with an uncoupled Z axis, a liner 2204 can be suspended under the XY gantry and attached to the build surface. The liner 2204 can either be designed to drape over the side of the build tray. Alternatively, the liner 2204 can be made with accordion folds 2206 to allow the liner 2204 to expand when the z axis lowers. Alternatively, it could be made from an elastic material which stretches with the z axis movement. These liners 2204 would envelop the build chamber and could be replaced easily to allow for rapid cleaning of the print environment.

While the foregoing includes the best mode and, where appropriate, other modes of performing the disclosure, the disclosure should not be limited to specific apparatus configurations or method steps disclosed in this description of the preferred embodiment. Those skilled in the art will also recognize that the disclosure has a broad range of applications, and that the embodiments admit of a wide range of modifications without departing from the inventive concepts.

What is claimed is:

1. A fabricator for fabricating edible structures, the fabricator comprising:
   a control module; the control module configured to receive instructions from a processing component; the processing component comprising:
   a processor; and
   a memory having computer code embodied therein, which, when executed by the
   processor, cause the processor to provide the instructions to the control module;
   a drive assembly configured to be controlled by the control module; and
   at least one food preparation processing tool head configured to be coupled to the drive assembly and configured to provide an energy difference to cause a chemical change in processed material edible structure deposited on a build surface, the chemical change rendering the dispensed material consumable; the at least one food preparation processing tool head comprising one of a tool head configured to receive hot oil and to deliver the hot oil onto the build surface, the tool head comprising an outlet for delivering the hot oil, the outlet being mounted on a rotary track, the rotary track configured to deposit the hot oil onto edible material dispensed on the build surface, or a tool head comprising a source of microwave radiation and microwave emitter; the chemical change rendering the processed material edible structure consumable;

wherein the instructions cause the control module to:
control operations of the at least one food preparation processing tool head.

2. The fabricator of claim 1, wherein the at least one food preparation processing tool head is detachable from the drive assembly.

3. The fabricator of claim 1, further comprising:
a build chamber comprising an gas inlet port and an outlet port, the build chamber attachable to a housing of the fabricator such that the fabricator is sealed from external influences; and
a gas inlet line configured to supply gas to the build chamber via the gas inlet port.

4. The fabricator of claim 1, wherein the food preparation processing tool head comprises a supply line having a first end coupled to an energy source and a second end having an outlet that is configured to direct energy received from the energy source towards the build surface; the energy source not being an ultraviolet light source.

5. The fabricator of claim 1 further comprising:
at least one food assembly processing tool head configured to be coupled to the drive assembly and configured to process material for fabricating an edible structure on a build surface;
wherein the at least one food processing tool head is configured to either perform at least one of a slicing, grating, dicing or blending operation and deposit processed material on the build surface; and
wherein the instructions also cause the control module to:
adjust a distance from the at least one food assembly processing tool head and the build surface; and
control operation of the at least one food assembly processing tool head.

6. The fabricator of claim 5, wherein the at least one food assembly processing tool head is detachable from the drive assembly.

7. The fabricator of claim 5, wherein the food assembly processing tool head comprises;
a material container configured to hold solid material;
a drive mechanism configured to drive the solid material; and
a processing surface through which the solid material is driven.

8. The fabricator of claim 7, wherein the food assembly processing tool head further comprises an outlet through which material is deposited on the build surface.

9. The fabricator of claim 5, wherein the food assembly processing tool head comprises a supply line having a first end coupled to a fluid source and a second end having an outlet that is configured to direct fluid received from the fluid source towards the build surface.

10. The fabricator of claim 9, wherein the fluid is a cold fluid configured to cool the material.

11. The fabricator of claim 5, wherein the at least one food assembly processing tool head is configured to deposit powdered material.

12. The fabricator of claim 5, further comprising a mechanism for placing a printer liner over the build surface.

13. The fabricator of claim 5, wherein the at least one food assembly processing tool head is configured to receive at least one of a soft-shelled packet and a hard-shelled packet containing material.

14. The fabricator of claim 13, wherein the at least one food assembly processing tool head comprises a roller-based mechanism configured to roll the soft-shelled packet causing the material to be dispensed from the soft-shelled packet.

15. The fabricator of claim 1 wherein the at least one food preparation processing tool head is configured to receive hot oil and to deliver the hot oil onto the build surface; and, wherein the at least one food processing tool head is configured to deliver the hot oil onto the build surface by one of spraying the hot oil, pouring the hot oil, and squirting the hot oil.

16. The fabricator of claim 1 wherein the at least one food preparation processing tool head is configured to receive hot oil and to deliver the hot oil onto the build surface; and, wherein the at least one food processing tool head comprises an outlet for delivering the hot oil; and wherein the outlet is mounted on a rotary track, the rotary track configured to deposit the hot oil onto edible material dispensed on the build surface.

17. The fabricator of claim 1 wherein the at least one food preparation processing tool head comprises a source of microwave radiation; and a microwave emitter.

18. A fabricator for fabricating edible structures, the fabricator comprising:
a control module; the control module configured to receive instructions from a processing component; the processing component comprising:
a processor; and
a memory having computer code embodied therein, which, when executed by the
processor, cause the processor to provide the instructions to the control module;
a drive assembly configured to be controlled by the control module; and
at least one detachable food assembly processing tool head configured to couple with the drive assembly, the tool head comprising:
a housing for holding a packet comprising material;
an actuation mechanism for dispensing material from the packet;
an outlet for depositing the dispensed material to a build surface; and
at least one food preparation processing component configured to process the dispensed material deposited on the build surface via the outlet; the at least one food preparation processing component configured to provide an energy difference to cause a chemical change in the dispensed material deposited on the build surface, the chemical change rendering the dispensed material consumable; the at least one food preparation component comprising one of a food preparation component configured to receive hot oil and to deliver the hot oil onto the build surface, the food preparation component comprising an outlet for delivering the hot oil, the outlet being mounted on a rotary track, the rotary track configured to deposit the hot oil onto edible material dispensed on the build surface, or a food preparation component comprising a source of microwave radiation and a microwave emitter;
wherein the instructions causing the control module to:

adjust a distance from the at least one detachable food assembly processing tool head and the build surface;

control operation of the at least one detachable food assembly processing tool head; and control operations of the at least one food preparation processing component.

19. The fabricator of claim 18 wherein the at least one food preparation processing component is configured to receive hot oil and to deliver the hot oil onto the build surface; and wherein the at least one food processing tool head is configured to deliver the hot oil onto the build surface by one of spraying the hot oil, pouring the hot oil, and squirting the hot oil.

20. The fabricator of claim 18 wherein the at least one food preparation processing component is configured to receive hot oil and to deliver the hot oil onto the build surface; and wherein the at least one food processing component comprises an outlet for delivering the hot oil; and wherein the outlet is mounted on a rotary track, the rotary track configured to deposit the hot oil onto edible material dispensed on the build surface.

21. The fabricator of claim 18 wherein the at least one food preparation processing component comprises a source of microwave radiation and a microwave emitter.

22. The fabricator of claim 21 wherein the microwave emitter is mounted on a rotary track, the rotary track being disposed around the outlet for depositing the dispensed material.

* * * * *